Dec. 13, 1938.  F. C. HUNT  2,139,825
ROLLING PIN FOR ROLLING AND AERATING DOUGH
Filed June 24, 1936
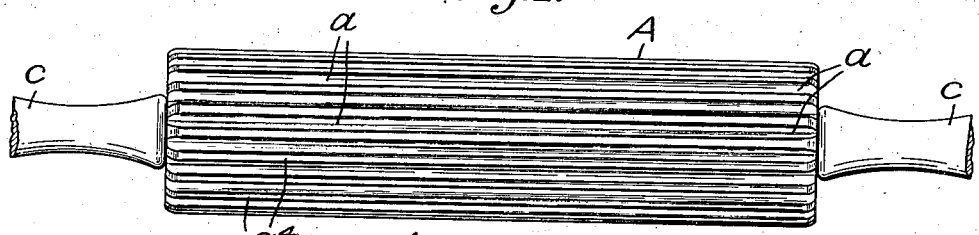
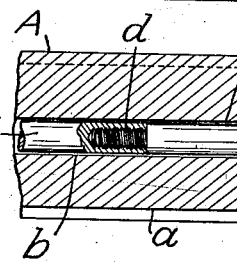
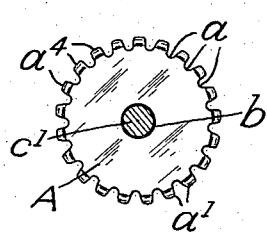
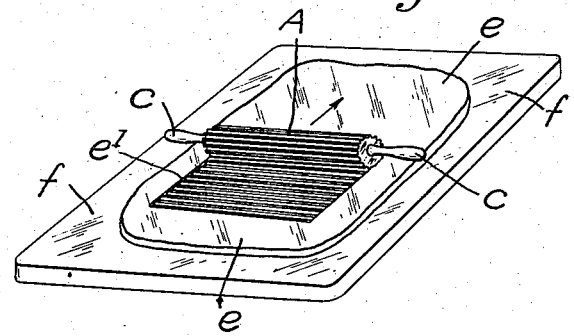
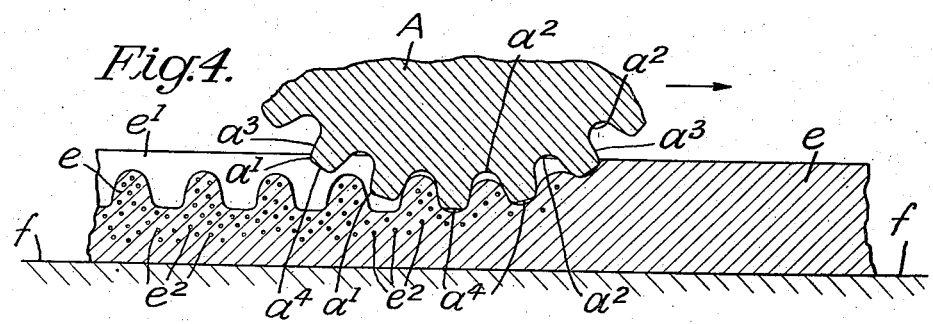
Inventor:—
Francis C. Hunt,
By:- Smith, Michael & Gardiner,
Attorneys.

Patented Dec. 13, 1938

2,139,825

UNITED STATES PATENT OFFICE 2,139,825

ROLLING PIN FOR ROLLING AND AERATING DOUGH

Francis Charles Hunt, London, England

Application June 24, 1936, Serial No. 87,057
In Great Britain November 26, 1935

1 Claim. (Cl. 107—50)

This invention relates to the art of making pastry and in particular to rolling pins for use in making pastry. The invention has for its main object to ensure the aeration of the paste, thereby saving time both in the rolling of the paste and in the cooking or baking operation, and making the pastry lighter,—particularly in the case of short-crust, puff and flaky pastry, crackers and wafers.

The invention is hereafter described with reference to the accompanying drawing, in which:—

Fig. 1 is an elevation of one form of the improved rolling pin, the handles being broken away.

Fig. 2 is an end view of the rolling pin, the handles being removed. Fig. 3 is a perspective view showing the rolling pin in operation. Fig. 4 is an enlarged detail in cross section, of part of the rolling pin, showing the preferred shape of the serrations and their action upon the paste.

Fig. 5 is a detail view in section of a suitable joint between the handles.

As shown in Figs. 1 and 2, the rolling pin A is of cylindrical shape provided with longitudinal serrations $a$ extending parallel to its generatrix for the entire length of the rolling surface, and with an axial bore $b$ to receive the inner ends $c^1$ of the handles $c$ which are connected together by a screw joint $d$ inside the bore, so that the pin can revolve upon the ends $c^1$ while the handles are held. The cylindrical pin may be hollow and may be rounded at its corners.

The rolling pin is made of normal general proportions, for example 2½ inches in diameter and 10 inches long (apart from the handles), but the serrations $a$ provide interruptions or grooves in the cylindrical surface so that the improved rolling pin does not touch the paste so much as one with a continuous cylindrical surface would do, and the pastry is therefore made lighter.

In operation, as illustrated in Fig. 3, the pin A is rolled lightly upon the surface of the dough or paste $e$, laid upon a pastry-board $f$, in the customary manner until the paste has been brought to the desired thickness. The tops of the serrations $a$, which take the form of blunt or flat-topped teeth with rounded or bevelled corners $a^1$, as seen more clearly in Fig. 4, press upon the paste, but do not cut through it because of the rounding or bevelling of the corners $a^1$. The paste $e$ is prevented from entering the grooves for more than a very small distance, because of the air-lock at the base $a^2$ of each groove. These grooves are wholly or partially sealed at their ends by the surface-layer of the adjacent paste, which forms a sealing wall as indicated at $e^1$ in Fig. 4. Thus the grooves are not freely open to the atmosphere as would be the case with circumferential or steeply helical grooves. A certain amount of air trapped at the top of the teeth $a^4$ where they bed into the dough and in the cup-shaped base $a^2$ of the grooves, is therefore transferred into the paste during the rolling operation and is retained therein as air-bubbles, indicated at $e^2$ in Fig. 4, thus aerating the paste and accelerating the work of rolling and cooking. This transfer of air from the base of the grooves into the paste is forcibly effected by reason of the pressure upon the rolling pin. The aerated paste is then, if required, cut to the desired shape and afterwards cooked by heat in the usual manner.

The slight corrugations formed on the paste $e$ by the imprint of the serrations $a$ lessen the compression and solidification of the paste during rolling. The material $e$ can not only extend in the direction of rolling, as usual, but also expand in the upward direction by reason of the grooves in the surface of the pin A. These corrugations are removed or obliterated at the next stroke of the rolling pin, which will probably be at an angle to the previous stroke. In any event they usually vanish during the subsequent cooking of the paste by heat.

Fig. 4 shows the preferred shape and proportions of the serrations $a$ more clearly on an enlarged scale. The circular pitch may be five-sixteenths of an inch, the depth of the slanting sides $a^3$ about three-sixteenths of an inch, and the flat tops $a^4$ of the serrations one-eighth of an inch wide, the grooves being of approximately the same width (one-eighth of an inch) at the base $a^2$; these dimensions represent the serrations which have been found most advantageous in practice for a baker's model, working with a considerable thickness of paste. For thinner work (such as in making wafers), the serrations $a$ are preferably made shallower and of finer pitch, that is, increased in number for the same diameter of rolling pin, the rounding or bevelling of the corners $a^1$ of the blunt teeth being somewhat increased to prevent cutting through the thin paste.

In this Fig. 4 the aerated dough is indicated by the portion provided with small circles to represent air bubbles. These aerations expand when cooking heat is applied to the dough and still further lighten the pastry.

It will be understood that the improved rolling pin may be made of any suitable material, china, earthenware, glass and wood being mentioned by way of examples, and that the dimensions may be varied as desired provided that the serrations $a$ are correctly spaced and proportioned to secure the introduction of air into the paste during rolling.

The rolling pin itself is made of normal general proportions, such as are customary in the case of ordinary plain rolling pins; the length is preferably equal to the normal standard, so that the rolling pin may be employed with pastry boards of current type, and the diameter is also approximately equal to the usual size in order to maintain a smooth rolling effect upon the paste.

From the foregoing description it will be noted that my improved rolling pin is provided on its surface with serrations (i. e. alternate ribs and grooves) extending substantially in the longitudinal direction and for the novel purpose of introducing air into the paste under rolling treatment and thereby aerating the pastry, prior to the customary baking operation.

What I claim is:—

A rolling pin for rolling and aerating dough wherein the sheet of dough being rolled by said pin is of a width greater than the length of said pin and extends at each side beyond the ends of said pin, with said pin projected into the surface of the dough a substantial distance, said pin comprising a substantially cylindrical body provided with uniform teeth extending substantially parallel to the axis of said body and along the entire length thereof, and with uniform grooves alternating with said teeth, said grooves having rounded bottom portions and extending parallel substantially to the axis of said body and along the entire length thereof, and said teeth each being formed with slanting sides and blunt tops and each having rounded corners where the sides and top meet, whereby during the rolling of the dough with said pin the ends of said grooves are sealed by portions of the dough extending beyond the ends of said pin and atmospheric air trapped within said grooves is forced into the surface of the dough to aerate the same.

FRANCIS CHARLES HUNT.